United States Patent
Yao

(10) Patent No.: US 8,132,234 B2
(45) Date of Patent: Mar. 6, 2012

(54) UNAUTHORIZED TERMINAL INFERRING SYSTEM, UNAUTHORIZED TERMINAL INFERRING DEVICE, AND COMMUNICATIONS TERMINAL DEVICE

(75) Inventor: Taketsugu Yao, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 1203 days.

(21) Appl. No.: 11/902,129

(22) Filed: Sep. 19, 2007

(65) Prior Publication Data

US 2008/0092218 A1    Apr. 17, 2008

(30) Foreign Application Priority Data

Oct. 16, 2006    (JP) .................... 2006-281908

(51) Int. Cl.
G06F 7/04    (2006.01)
(52) U.S. Cl. .............................. 726/3; 726/23
(58) Field of Classification Search .................. None
See application file for complete search history.

(56) References Cited

U.S. PATENT DOCUMENTS

| | | | | |
|---|---|---|---|---|
| 7,024,695 | B1 * | 4/2006 | Kumar et al. .............. | 726/26 |
| 2003/0070067 | A1 * | 4/2003 | Saito ....................... | 713/150 |
| 2006/0059224 | A1 * | 3/2006 | Yao ......................... | 709/201 |

FOREIGN PATENT DOCUMENTS

| | | |
|---|---|---|
| JP | 2003-069581 | 3/2003 |
| JP | 2005-286956 | 10/2005 |

OTHER PUBLICATIONS

Yao et al. (Taketsugu Yao, Shigery Fukunaga, Toshihisa Nakai, "Reliable Broadcast Message Authentication in Wireless Sensor Networks", EUC 2006 Workshops, Aug. 2006, ISBN 0302-9743).*

* cited by examiner

*Primary Examiner* — Peter Poltorak
(74) *Attorney, Agent, or Firm* — Rabin & Berdo, PC

(57) ABSTRACT

There is provided an unauthorized terminal inferring device (100) device that is connected to a plurality of communications terminal devices (IDi) by a multi-hop network. The device (100) includes a communications terminal information control portion (120) that controls identification information and key information for the communications terminal devices (IDi), a transmission portion (160) that transmits challenge information to the devices (IDi), a receiving portion (170) that receives from the devices (IDi) response information that corresponds to the challenge information, a response information verification portion (130) that verifies whether or not an authenticator that is contained in the response information is correct, and an unauthorized terminal device inferring processing portion (140) that, in a case where the verification result indicates that the response information is not legitimate, requests that each of the devices (IDi) retransmit received and generated information, then infers which communications terminal device performed the unauthorized behavior.

12 Claims, 10 Drawing Sheets

UNAUTHORIZED TERMINAL INFERRING SYSTEM, UNAUTHORIZED TERMINAL INFERRING DEVICE, AND COMMUNICATIONS TERMINAL DEVICE

CROSS REFERENCE TO RELATED APPLICATION

The disclosure of Japanese Patent Application No. JP 2006-281908 filed on Oct. 16, 2006 is incorporated herein by reference in its entirety.

BACKGROUND OF THE INVENTION

1. Field of the Invention

The present invention relates to an unauthorized terminal inferring system, an unauthorized terminal inferring device, and a communications terminal device.

2. Description of the Related Art

In recent years, sensor networks have been proposed that are made up of large numbers of sensor devices that have wireless communications functions. Here, a sensor network is assumed to be a multi-hop network that transmits and receives packets among communications terminals and in which at least one communications terminal relays the packets.

Technologies have been developed that can deal with unauthorized behavior by an unauthorized relay terminal in a wireless multi-hop network. For example, in Japanese Patent Application Publication No. JP-A-2005-286956, an ad hoc wireless network system and its method for controlling unauthorized actions are described that control the establishment of communications routes such that, when an unauthorized action such as tampering, destruction, or the like is performed on information that is transmitted from a base station to a user in response to a request from the user, the location of the improper action is inferred, and a communications route that passes through the unauthorized location is not established.

Furthermore, in Japanese Patent No. JP-3749679, for example, a method is described for preventing insertion of an unauthorized packet into a wireless multi-hop network. The method creates a first packet check data using a first secret information that is known only to a communications terminal that has been authenticated by the network. The method also creates a second packet check data using a second secret information that is shared with a destination terminal for the packet. The method then creates the packet with the first packet check data and the second packet check data appended to it.

However, the wireless communications terminals that make up the sensor network are generally developed with an emphasis on low cost, so it cannot necessarily be assumed that they carry high-cost, tamper-resistant memory devices (devices that physically protect secret information such as key information and the like from leaking and tampering). That is, a danger exists that a legitimate communications terminal device that has been authenticated by the network can be made to behave in an unauthorized manner by an attacker who has improperly obtained key information. If such a legitimate (recognized as legitimate) communications terminal device becomes a packet relay terminal device in the multi-hop network, unauthorized behaviors such as tampering with the packets and the like can be performed as authenticated actions. If the network is to function properly, a technology must be provided that detects a legitimate (recognized as legitimate) communications terminal device that is behaving improperly as described above.

The known technologies described above do not assume that a communications terminal device that is recognized as legitimate will behave improperly. That is, it is not assumed that, even if verification of the check data and the author's name that are appended to a packet is successful, the packet for which the check data and author's name are guaranteed is not necessarily legitimate.

SUMMARY OF THE INVENTION

Accordingly, the present invention addresses the problems described above to provide an unauthorized terminal inferring system, an unauthorized terminal inferring device, and a communications terminal device that are new and improved and that can infer that a communications terminal device has behaved in an unauthorized manner in order to cut off from the network a communications terminal device that is recognized as legitimate but that performs a disruptive attack such as tampering with a packet that is being relayed, refusing to relay a packet, or the like.

In order to solve the problems described above, according to an aspect of the present invention, the unauthorized terminal inferring system is a system in which a plurality of the communications terminal devices and the unauthorized terminal inferring device are connected by a multi-hop network and that uses the unauthorized terminal inferring device to infer which communications terminal device performed an unauthorized operation. The unauthorized terminal inferring system includes the unauthorized terminal inferring device and the communications terminal devices. The unauthorized terminal inferring device includes a communications terminal information control portion that controls identification information and key information for the communications terminal devices that make up the network. The unauthorized terminal inferring device also includes a generation portion that generates challenge information to infer that the unauthorized operation occurred. The unauthorized terminal inferring device also includes a transmission portion that transmits the challenge information to the communications terminal devices and a receiving portion that receives from the communications terminal devices response information that corresponds to the challenge information. The unauthorized terminal inferring device also includes a response information verification portion that verifies whether or not an authenticator that is contained in the response information that was transmitted by the communications terminal devices is correct. The unauthorized terminal inferring device also includes an unauthorized terminal device inferring processing portion that, in a case where the verification result indicates that the response information is not legitimate, requests that each of the communications terminal devices retransmit received and generated information, then, based on the retransmitted received and generated information, infers which communications terminal device performed the unauthorized operation. Each of the communications terminal devices includes a receiving portion that receives the challenge information from another communications terminal device or the unauthorized terminal inferring device by one of a relayed transmission and a direct transmission. Each communications terminal device also includes an authenticator generation portion that generates an authenticator that is included in the identification information and the key information. Each communications terminal device also includes a received and generated information storage portion that holds the received and generated information, which is obtained by appending the authenticator that the communications terminal device generates to the response information that was received from another communications terminal device. Each communications terminal device also includes a response information generation portion that generates the response information by appending the authenticator that the communications terminal device generates to the response information that was received from another communications terminal device. Each communications terminal device also includes a transmission portion that transmits the response information or the received and generated information to another communications terminal device or the unauthorized terminal inferring device by one of a relayed transmission and a direct transmission.

If the configuration described above is used, the challenge information that is used to infer that the unauthorized operation occurred is transmitted from the unauthorized terminal inferring device to the communications terminal devices, and the response information that corresponds to the challenge information is transmitted from the communications terminal devices to the unauthorized terminal inferring device. The unauthorized terminal inferring device verifies whether or not the authenticator that is contained in the response information is correct. In a case where the verification result indicates that the response information is not legitimate, the unauthorized terminal inferring device requests that each of the communications terminal devices retransmit the received and generated information, then, based on the retransmitted received and generated information, infers which communications terminal device performed the unauthorized operation. Therefore, in the system in which the plurality of the communications terminal devices are connected by the multi-hop network, it is possible to infer which communications terminal device performed the unauthorized operation.

In the above aspect, the communications terminal device that performed the unauthorized operation may be one of a communications terminal device that pretended to be an authentic communications terminal device and a communications terminal device that altered authentic data.

In order to solve the problems described above, according to another aspect of the present invention, the unauthorized terminal inferring device is connected to a plurality of the communications terminal devices by a multi-hop network and infers which communications terminal device performed an unauthorized operation. The unauthorized terminal inferring device includes a communications terminal information control portion that controls identification information and key information for the communications terminal devices that make up the network. The unauthorized terminal inferring device also includes a generation portion that generates challenge information to infer that the unauthorized operation occurred. The unauthorized terminal inferring device also includes a transmission portion that transmits the challenge information to the communications terminal devices and a receiving portion that receives from the communications terminal devices response information that corresponds to the challenge information. The unauthorized terminal inferring device also includes a response information verification portion that verifies whether or not an authenticator that is contained in the response information that was transmitted by the communications terminal devices is correct. The unauthorized terminal inferring device also includes an unauthorized terminal device inferring processing portion that, in a case where the verification result indicates that the response information is not legitimate, requests that each of the communications terminal devices retransmit received and generated information, then, based on the retransmitted received and generated information, infers which communications terminal device performed the unauthorized operation.

If the configuration described above is used, the challenge information that is used to infer that the unauthorized operation occurred is transmitted to the communications terminal devices, and the response information that corresponds to the challenge information is transmitted from the communications terminal devices. The unauthorized terminal inferring device verifies whether or not the authenticator that is contained in the response information is correct. In a case where the verification result indicates that the response information is not legitimate, the unauthorized terminal inferring device requests that each of the communications terminal devices retransmit the received and generated information, then, based on the retransmitted received and generated information, infers which communications terminal device performed the unauthorized operation. Therefore, it is possible to infer which communications terminal device among the plurality of the communications terminal devices that are connected to the unauthorized terminal inferring device performed the unauthorized operation.

In the above aspect, the unauthorized terminal inferring device may also include a challenge information generation portion that generates the challenge information. If this configuration is used, the challenge information that is generated by the unauthorized terminal inferring device can be transmitted to the communications terminal devices.

In the above aspect, the communications terminal device that performed the unauthorized operation may be one of a communications terminal device that pretended to be an authentic communications terminal device and a communications terminal device that altered authentic data.

In order to solve the problems described above, according to another aspect of the present invention, the communications terminal device is connected to a plurality of other communications terminal devices and the unauthorized terminal inferring device by a multi-hop network. The communications terminal device includes a receiving portion that receives the challenge information from one of another communications terminal device and the unauthorized terminal inferring device by one of a relayed transmission and a direct transmission. The communications terminal device also includes an authenticator generation portion that generates an authenticator that is included in the identification information and the key information. The communications terminal device also includes a received and generated information storage portion that holds the received and generated information, which is obtained by appending the authenticator that the communications terminal device generates to the response information that was received from another communications terminal device. The communications terminal device also includes a response information generation portion that generates the response information by appending the authenticator that the communications terminal device generates to the response information that was received from another communications terminal device. The communications terminal device also includes a transmission portion that transmits one of the response information and the received and generated information to one of another communications terminal device and the unauthorized terminal inferring device by one of a relayed transmission and a direct transmission.

If the configuration described above is used, the challenge information is received from one of another communications terminal device and the unauthorized terminal inferring device by one of the relayed transmission and the direct transmission, the authenticator that is contained in the communications terminal device's own identification information and key information is generated, and the received and generated information, in which the authenticator that the communications terminal device generates is appended to the response information that was received from another communications terminal device, is retained. The authenticator that the communications terminal device generates is appended to the response information that was received from another communications terminal device to generate new response information. In a case where the result of the verification by the unauthorized terminal inferring device is that the response information is not legitimate, each of the communications terminal devices can retransmit the received and generated information to the unauthorized terminal inferring device, and based on the retransmitted received and generated information, the unauthorized terminal inferring device can infer which communications terminal device performed the unauthorized behavior. It is therefore possible to infer which communications terminal device behaved in an unauthorized manner.

According to the present invention, it is possible to provide an unauthorized terminal inferring system, an unauthorized terminal inferring device, and a communications terminal device that are new and improved and that make it possible to reliably infer which communications terminal device is unauthorized.

DETAILED DESCRIPTION OF THE PREFERRED EMBODIMENTS

Figure 1:
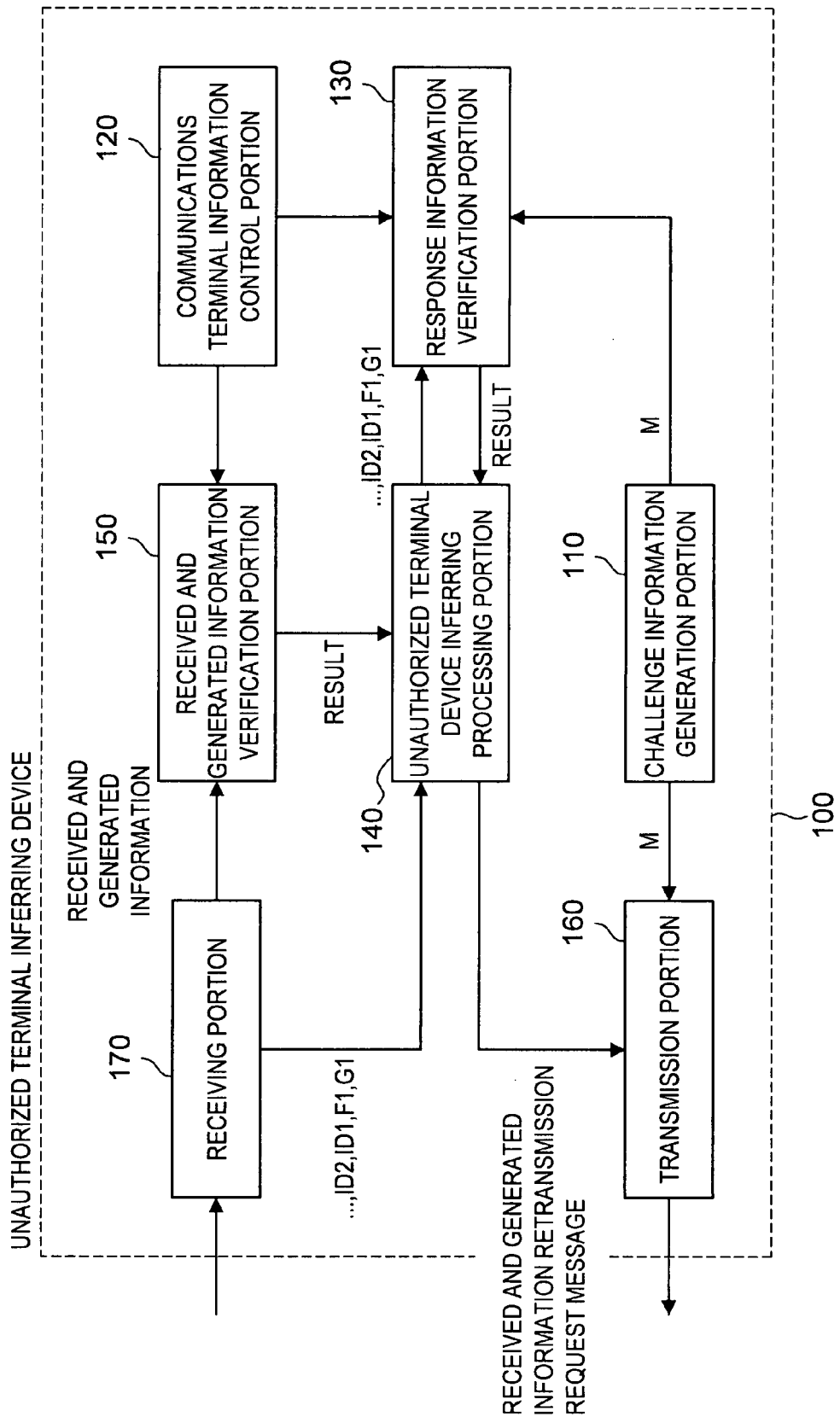
FIG. 1 is a block diagram that shows an internal configuration of an unauthorized terminal inferring device according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

In the embodiment described below, communications terminal devices IDi that make up a multi-hop network generate response information in response to received challenge information, then transmit the generated response information to an unauthorized terminal inferring device 100. The unauthorized terminal inferring device 100 verifies whether or not the response information is legitimate. If the verification fails, the unauthorized terminal inferring device 100 determines that a communications terminal device IDi that behaved in an unauthorized manner is present among the communications terminal devices IDi involved in the transmission of the response information. The unauthorized terminal inferring device 100 is characterized in that it infers which communications terminal device IDi behaved in an unauthorized manner by requesting that each of the communications terminal devices IDi retransmit the received information and the generated information.

The present embodiment relates to a technology that infers which communications terminal device IDi among the communications terminal devices IDi in multi-hop network has behaved in an unauthorized manner. "Behaved in an unauthorized manner" is assumed to mean, for example, that a communications terminal device IDi that relayed communicated information in the multi-hop network tampered with a message that was being relayed or discarded (refused to relay) a message that was being relayed.

FIG. 1 is a block diagram that shows an internal configuration of an unauthorized terminal inferring device according to the embodiment of the present invention. In FIG. 1, the unauthorized terminal inferring device 100 includes a challenge information generation portion 110, a communications terminal information control portion 120, a response information verification portion 130, an unauthorized terminal device inferring processing portion 140, a received and generated information verification portion 150, a transmission portion 160, and a receiving portion 170.

The challenge information generation portion 110 generates challenge information and gives the generated challenge information to the transmission portion 160 and the response information verification portion 130. The challenge information may be random number information, for example, or may be a message to be transmitted to each communications terminal device IDi that makes up the network.

The communications terminal information control portion 120 controls identification information and key information that is held by each communications terminal that makes up the network. The identification information is a bit string that is unique to each communications terminal that makes up the network and is assumed to be, for example, a unique MAC address for each communications terminal device IDi, a network address that is unique only within the network, or the like, but it is not particularly limited. The key information is assumed to be secret key information that is shared one-to-one between the unauthorized terminal inferring device 100 and each communications terminal device IDi. The key information may also contain counter information along with the key information to prevent a retransmission attack. The communications terminal information control portion 120 gives the identification information and the key information for the communications terminal devices IDi that it controls to the response information verification portion 130 and the received and generated information verification portion 150.

The response information verification portion 130 uses the key information given to it by the communications terminal information control portion 120 and the challenge information given to it by the challenge information generation portion 110 to verify an authenticator of the response information given to it by the unauthorized terminal device inferring processing portion 140. If the verification results match, the response information verification portion 130 transmits a successful verification results message to the unauthorized terminal device inferring processing portion 140. If the verification results do not match, the response information verification portion 130 transmits a failed verification results message to the unauthorized terminal device inferring processing portion 140.

The received and generated information verification portion 150 uses the key information given to it by the communications terminal information control portion 120 for the communications terminal device IDi that is the transmission source for the received and generated information given to it by the receiving portion 170 to verify an authenticator (Gi) that is contained in the received and generated information. If the verification succeeds, the received and generated information verification portion 150 gives the received and generated information and a successful authenticator (Gi) verification message to the unauthorized terminal device inferring processing portion 140. If the verification fails, the received and generated information verification portion 150 gives a failed authenticator (Gi) verification message to the unauthorized terminal device inferring processing portion 140. Furthermore, if, for a specified period of time, the received and generated information verification portion 150 is not given received and generated information for which the authenticator (Gi) is successfully verified, the received and generated information verification portion 150 gives a no-reply message to the unauthorized terminal device inferring processing portion 140.

The transmission portion 160 transmits the challenge information given to it by the challenge information generation portion 110 to the communications terminal devices IDi in the network. The transmission portion 160 also transmits to the communications terminal devices IDi a received and generated information retransmission request message given to it by the unauthorized terminal device inferring processing portion 140.

The receiving portion 170 gives the response information received from the communications terminals to the unauthorized terminal inferring device 100. The receiving portion 170 also gives the received and generated information received from the communications terminals to the received and generated information verification portion 150.

Figure 2:
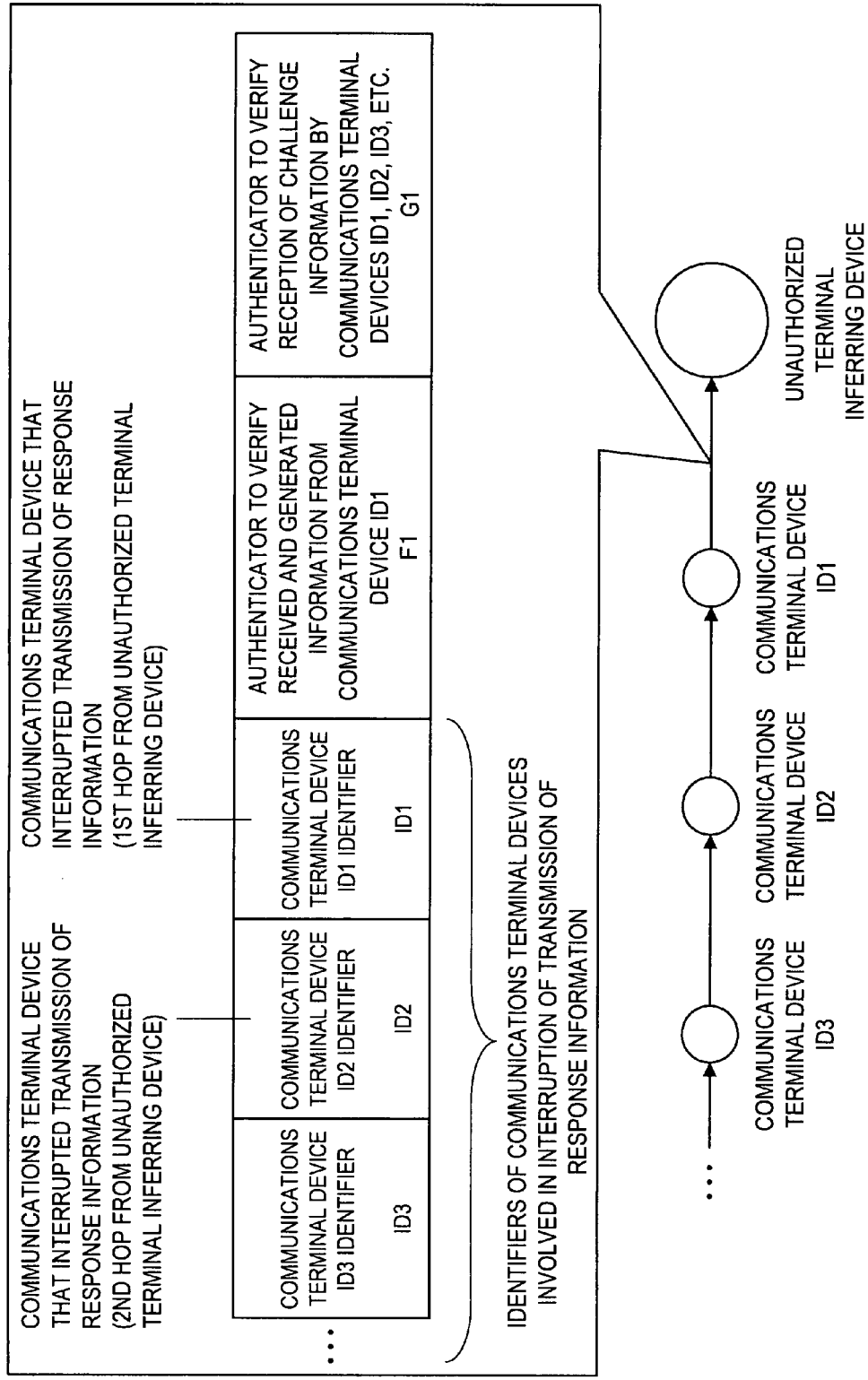
FIG. 2 is a schematic diagram that shows an example of response information that is transmitted to the unauthorized terminal inferring device from a communications terminal device.

An example of the response information that is transmitted to the unauthorized terminal inferring device 100 by the communications terminal devices IDi is shown in FIG. 2. As FIG. 2 shows, the response information includes identifiers for all of the communications terminal devices ID1, ID2, ID3, and the like that have relayed the response information. In FIG. 2, authenticators (F1, G1) are information that is generated using secret key information that is shared by the communications terminal device ID1 and the unauthorized terminal inferring device 100. An authenticator Fi, which is used to verify received and generated information that is generated by a communications terminal device IDi located at the i-th hop from an unauthorized terminal device, is described by Equation 1 below.

$$Fi = F(KIDi, \ldots, IDi, M) \qquad \text{Equation 1:}$$

Here, the function F( ) is a value for which the inputs are the secret key (KIDi) that is shared by the unauthorized terminal inferring device 100 and the communications terminal devices IDi, the identifiers ( . . . , IDi) of the communications terminal devices IDi involved in the relaying of the response information, and the challenge information (M). For example, assume that the key information KIDi is used to generate a MAC or a keyed-hashing for message authentication (HMAC) for a bit string " . . . ∥IDi∥" (where "∥" indicates bit linking) that is built from the challenge information and the identifiers of the communications terminal devices IDi involved in the relaying of the response information. The authenticator Gi, which is used to verify reception of the communications terminal device challenge information generated by a communications terminal device IDi located at the i-th hop from an unauthorized terminal device, is described by Equation 2 below.

$$Gi = G(KIDi, \ldots, ID(i+1), F(i+1), G(i+1), IDi, Fi) \qquad \text{Equation 2:}$$

Here, the function G( ) is a value for which the inputs are the secret key (KIDi) that is shared by the unauthorized terminal inferring device 100 and the communications terminal devices IDi, the identifiers ( . . . ) of the communications terminal devices IDi involved in the relaying of the response information (which are not present in some cases), the identifier (ID(i+1)) of a communications terminal device (i+1) (the communications terminal device located at the i+1-th hop from an unauthorized terminal device; the device that receives a relay request from the communications terminal device i), the authenticators (F(i+1), G(i+1)) received from the communications terminal device (i+1) (which is not present in some cases), the identifier (IDi) of the communications terminal device IDi, and the authenticator (Fi) that is generated by the communications terminal device IDi. For example, assume that the key information KIDi is used to generate a MAC or an HMAC for a bit string " . . . ∥ID(i+1)∥F(i+1)∥G(i+1)∥IDi∥Fi" (where "∥" indicates bit linking) that is built from information other than the key information KIDi.

When the response information verification portion 130 is given a request from the unauthorized terminal device inferring processing portion 140 to verify the response information and the authenticator (Gi), the response information verification portion 130 uses the challenge information given to it by the challenge information generation portion 110 and the key information for the communications terminal device IDi given to it by the communications terminal information control portion 120 to verify whether or not the authenticator (Gi) is correct. The response information verification portion 130 then transmits the verification result to the unauthorized terminal device inferring processing portion 140. Furthermore, when the response information verification portion 130 is given a request from the unauthorized terminal device inferring processing portion 140 to verify the response information and the authenticator (Fi), the response information verification portion 130 uses the challenge information given to it by the challenge information generation portion 110 and the key information for the communications terminal device IDi given to it by the communications terminal information control portion 120 to verify whether or not the authenticator (Fi) is correct. The response information verification portion 130 then transmits the verification result to the unauthorized terminal device inferring processing portion 140.

The unauthorized terminal device inferring processing portion 140 infers which communications terminal device IDi in the network performed the unauthorized behavior. In order to verify the authenticator (Gi) that is appended to the response information given to the unauthorized terminal device inferring processing portion 140 by the receiving portion 170, the unauthorized terminal device inferring processing portion 140 gives to the response information verification portion 130 the request to verify the response information and the authenticator (Gi). Then, if a successful verification results message is transmitted from the response information verification portion 130, the unauthorized terminal device inferring processing portion 140 treats the communications terminal devices IDi that were involved in the transmission of the response information (all of the communications terminal devices IDi indicated by the identifiers contained in the response information) as legitimate communications terminal devices. The unauthorized terminal device inferring processing portion 140 also knows that the challenge information M arrived correctly at the communications terminal devices.

On the other hand, if a failed verification results message is transmitted from the response information verification portion 130, the unauthorized terminal device inferring processing portion 140 determines that there is a possibility that an unauthorized communications terminal device is concealed among the communications terminal devices IDi that were involved in the transmission of the response information (all of the communications terminal devices IDi indicated by the identifiers contained in the response information). The unauthorized terminal device inferring processing portion 140 therefore performs an unauthorized terminal inferring processing. The unauthorized terminal inferring processing is performed for the communications terminal devices IDi that are present in the route where it has been determined that there is a possibility that an unauthorized communications terminal device is concealed. The unauthorized terminal inferring processing is performed in order starting with the communications terminal device IDi that is the least number of hops from the unauthorized terminal inferring device 100 (starting with the communications terminal device ID1, the communications terminal device that last relayed the response information to the unauthorized terminal inferring device 100, then to ID2, ID3, and so on).

Figure 4:
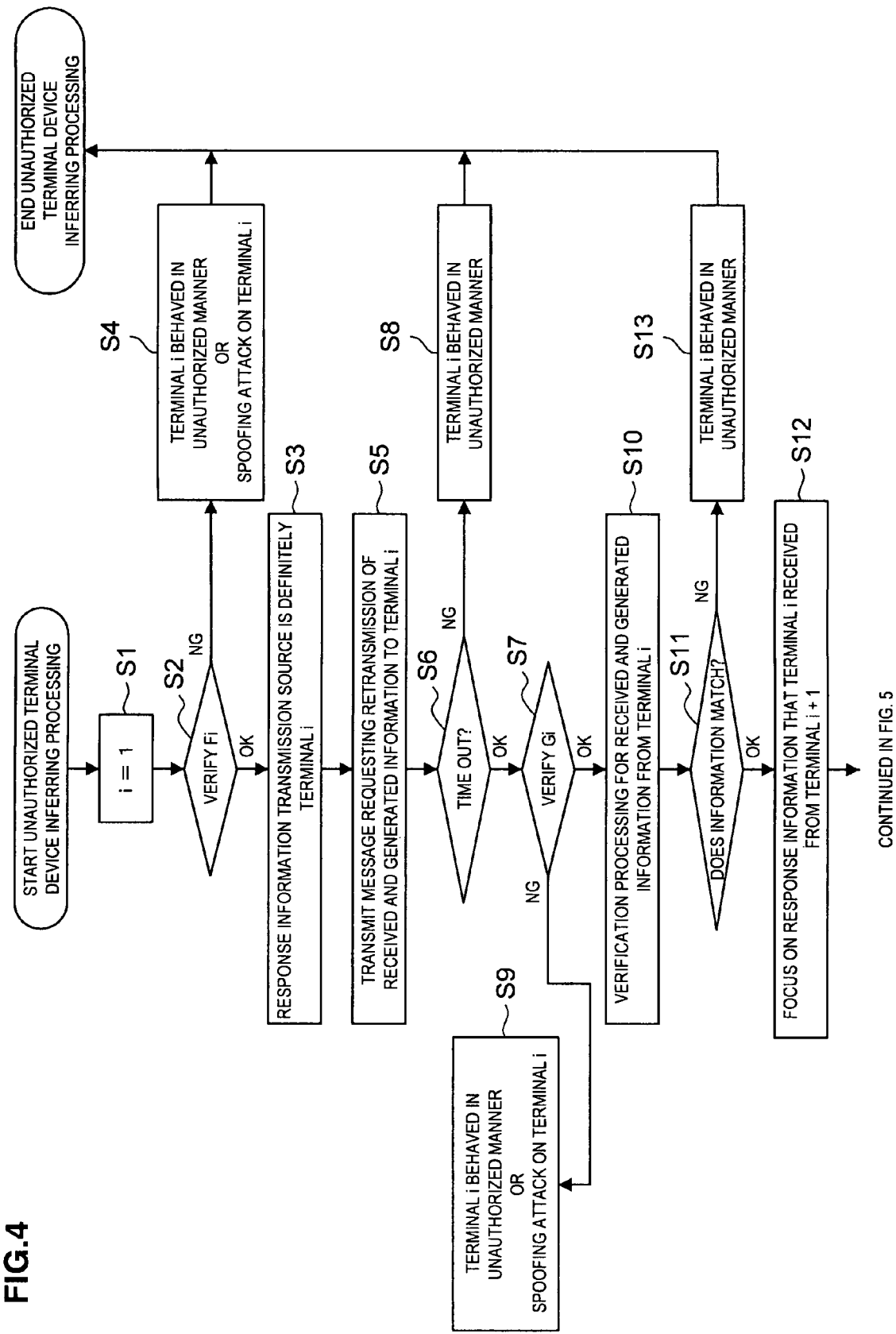
FIG. 4 is a flowchart that shows a procedure for an unauthorized terminal inferring processing.
Figure 5:
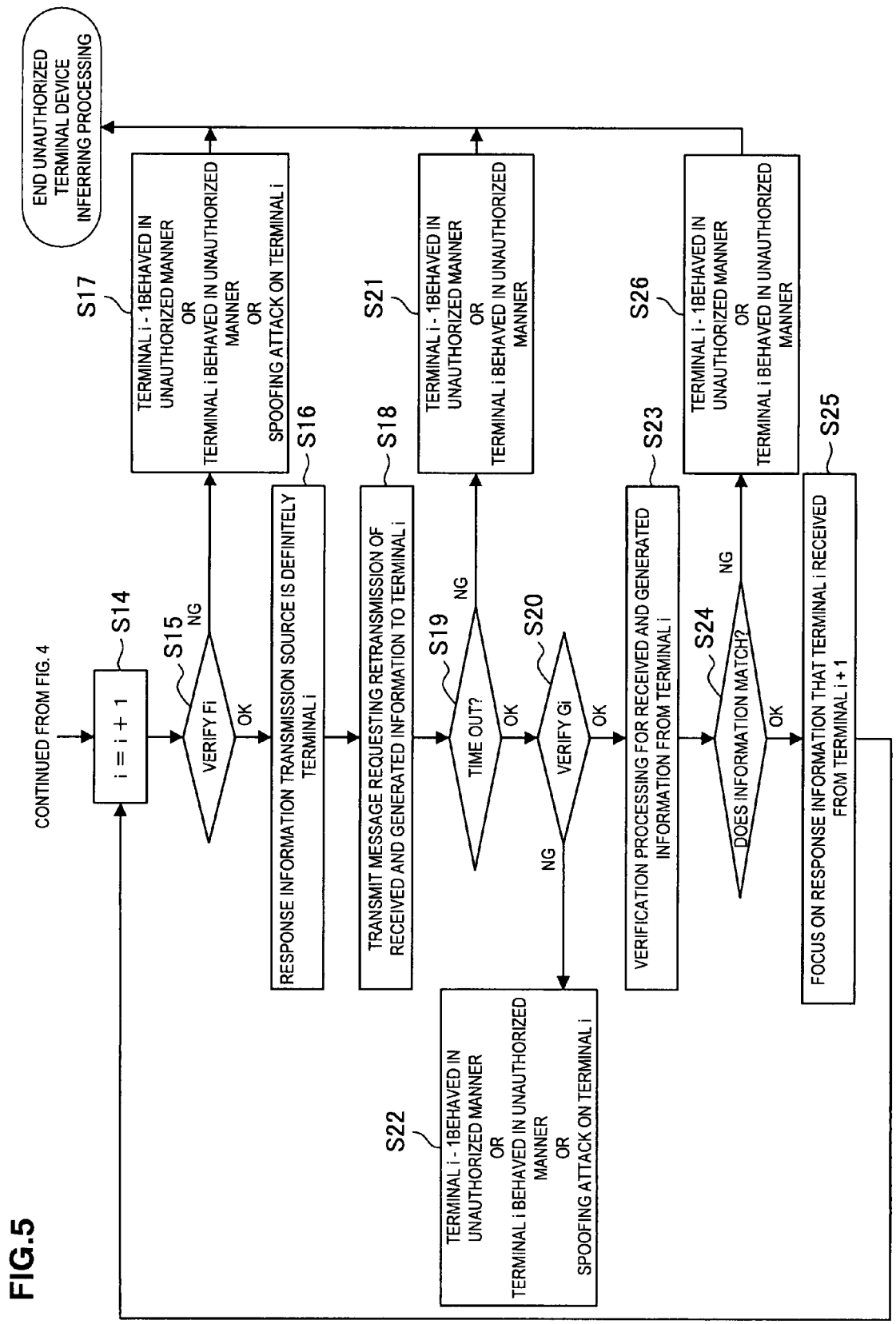
FIG. 5 is a flowchart that shows the procedure for the unauthorized terminal inferring processing, continued from FIG. 4.

The procedure for the unauthorized terminal inferring processing will be explained below with reference to the flowcharts in FIGS. 4 and 5. First, the request to verify the response information and the authenticator (F1) is given to the response information verification portion 130 in order to verify whether or not the transmission source of the response information is really the communications terminal device ID1 (Step S2 in FIG. 4). Next, if a failed verification results message is transmitted from the response information verification portion 130, the two possibilities of unauthorized behavior described below are detected, and the unauthorized terminal inferring processing ends (Step S4).

The transmission source terminal for the response information is not the communications terminal device ID1 (a spoofing attack was made on the communications terminal device ID1).

The communications terminal device ID1 performed unauthorized behavior.

On the other hand, if a successful verification results message is transmitted from the response information verification portion 130, the unauthorized terminal device inferring processing portion 140 authenticates that the transmission source terminal for the response information is the communications terminal device ID1. The unauthorized terminal device inferring processing portion 140 also knows that the challenge information M has definitely arrived at the communications terminal device ID1 (Step S3). Next, the unauthorized terminal device inferring processing portion 140 generates and gives to the transmission portion 160 a message requesting the retransmission of the received and generated information in order to request the transmission of the received and generated information to the communications terminal device ID1 (Step S5). Then the unauthorized terminal device inferring processing portion 140 waits for the received and generated information verification portion 150 to give it the received and generated information (Step S6). Then the received and generated information verification portion 150 receives Gi for the received and generated information and verifies Gi (Step S7).

Figure 3:
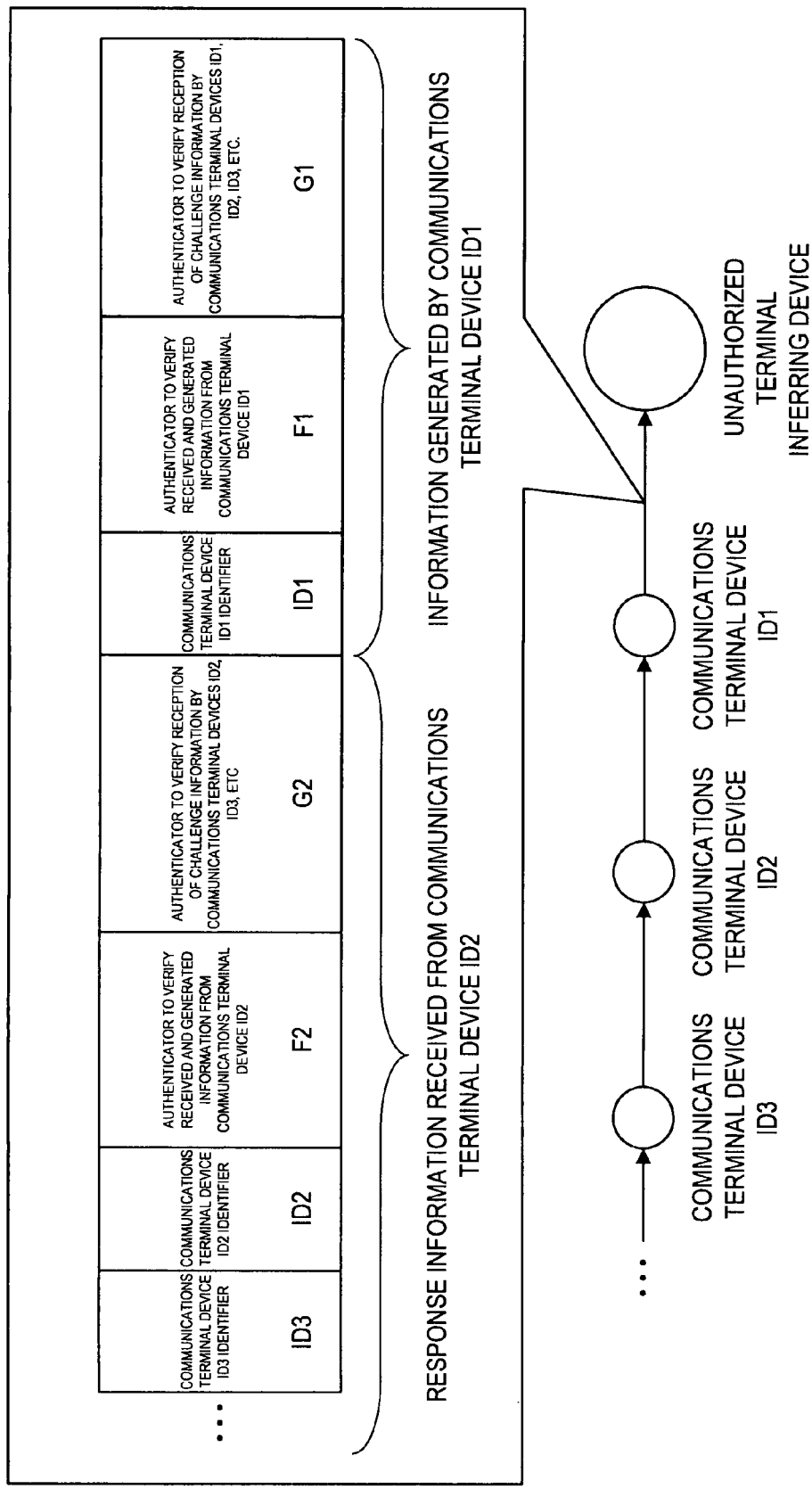
FIG. 3 is a schematic diagram that shows an example of reception generation information.

An example of the received and generated information is shown in FIG. 3. In FIG. 3, the identifiers for the communications terminal devices ( . . . , ID3, ID2) and the authenticators (F2, G2) are the response information that is received from the communications terminal device ID2. The identifier for the communications terminal device ID1 (ID1) and the authenticators (F1, G1) are the information that is newly generated when the response information is relayed by the communications terminal device ID1. If a failed verification results message for the authenticator (G1) is transmitted from the received and generated information verification portion 150, the unauthorized terminal device inferring processing portion 140 knows that the possibilities of unauthorized behavior described below exist (Step S9).

The communications terminal device ID1 performed unauthorized behavior (there is concern that unauthorized behavior by the communications terminal device ID1 will be detected, and there is uncertainty as to whether the received and generated information for which the authenticator verification failed was transmitted).

The transmission source terminal for the response information is not the communications terminal device ID1 (a spoofing attack was made on the communications terminal device ID1).

Next, if a no-reply message is transmitted from the received and generated information verification portion 150, the possibility of unauthorized behavior described below is detected, and the unauthorized terminal inferring processing ends (Step S8).

The communications terminal device ID1 performed unauthorized behavior (there is concern that unauthorized behavior by the communications terminal device ID1 will be detected, and there is uncertainty as to whether the communications terminal device ID1 discarded the request to retransmit the received and generated information).

On the other hand, if the received and generated information and a successful verification results message for the authenticator (G1) are transmitted from the received and generated information verification portion 150, the unauthorized terminal device inferring processing portion 140 performs a verification processing for the received and generated information (Step S10). In the verification processing for the received and generated information, the unauthorized terminal inferring device 100 verifies whether or not the information contained in the response information ( . . . , ID3, ID2, ID1, F1, G1) that was already received from the communications terminal device ID1 matches the information contained in the received and generated information (Step S11). If the verification fails, the possibility of unauthorized behavior described below is detected, and the unauthorized terminal inferring processing ends (Step S13).

The communications terminal device ID1 performed unauthorized behavior (there is uncertainty as to whether the communications terminal device ID1 tampered with the response information when relaying it).

On the other hand, if the verification is successful, the unauthorized terminal device inferring processing portion 140 knows that, within the information contained in the received and generated information, the response information received from the communications terminal device ID2 is erroneous (Step S12). Next, the unauthorized terminal inferring processing is performed with respect to the communications terminal device ID2, which is the next communications terminal device that relayed the response information (Step S14 in FIG. 5). First, the request to verify the response information and the authenticator (F2) is given to the response information verification portion 130 in order to verify whether or not the transmission source of the response information is really the communications terminal device ID2 (Step S15). Next, if a failed verification results message is transmitted from the response information verification portion 130, the three possibilities of unauthorized behavior described below are detected, and the unauthorized terminal inferring processing ends (Step S17).

The transmission source terminal for the response information is not the communications terminal device ID2 (a spoofing attack was made on the communications terminal device ID2).

The communications terminal device ID1 performed unauthorized behavior (there is uncertainty as to whether the communications terminal device ID1 tampered with the challenge information M and then relayed it).

The communications terminal device ID2 performed unauthorized behavior.

On the other hand, if a successful verification results message is transmitted from the response information verification portion 130, the unauthorized terminal device inferring processing portion 140 authenticates that the transmission source terminal for the response information is the communications terminal device ID2. The unauthorized terminal device inferring processing portion 140 also knows that the challenge information M has definitely arrived at the communications terminal device ID2 (Step S16). Next, the unauthorized terminal device inferring processing portion 140 generates and gives to the transmission portion 160 a message requesting the retransmission of the received and generated information in order to request the transmission of the received and generated information to the communications terminal device ID2 (Step S18). Then the unauthorized terminal device inferring processing portion 140 waits for the received and generated information verification portion 150 to give it the received and generated information (Step S19). Then the received and generated information verification portion 150 receives the received and generated information Gi and verifies Gi (Step S20). If a failed verification results message for the authenticator (G2) is transmitted from the received and generated information verification portion 150, the unauthorized terminal device inferring processing portion 140 knows that the possibilities of unauthorized behavior described below exist (Step S22).

The communications terminal device ID1 performed unauthorized behavior (there is concern that unauthorized behavior by the communications terminal device ID1 will be detected, and there is uncertainty as to whether the communications terminal device ID1 tampered with the received and generated information from the communications terminal device ID2 and then relayed it).

The communications terminal device ID2 performed unauthorized behavior.

The transmission source terminal for the response information is not the communications terminal device ID2 (a spoofing attack was made on the communications terminal device ID2).

Next, if a no-reply message is transmitted from the received and generated information verification portion 150, the possibilities of unauthorized behavior described below are detected, and the unauthorized terminal inferring processing ends (Step S21).

The communications terminal device ID1 performed unauthorized behavior (there is concern that unauthorized behavior by the communications terminal device ID1 will be detected, and there is uncertainty as to whether the communications terminal device ID1 refused to relay the received and generated information or the message requesting the retransmission of the received and generated information).

The communications terminal device ID2 performed unauthorized behavior (there is concern that unauthorized behavior by the communications terminal device ID2 will be detected, and there is uncertainty as to whether the communications terminal device ID2 discarded the request to retransmit the received and generated information).

On the other hand, if the received and generated information and a successful verification results message for the authenticator (G2) are transmitted from the received and generated information verification portion 150, the unauthorized terminal device inferring processing portion 140 performs the verification processing for the received and generated information (Step S23). In the verification processing for the received and generated information, the unauthorized terminal inferring device 100 verifies whether or not the information contained in the response information (..., ID3, ID2, F2, G2) that was already received from the communications terminal device ID2 matches the information contained in the received and generated information (Step S24). If the verification fails, the possibilities of unauthorized behavior described below are detected, and the unauthorized terminal inferring processing ends (Step S26).

The communications terminal device ID1 performed unauthorized behavior (there is uncertainty as to whether the communications terminal device ID1 tampered with the response information when relaying it).

The communications terminal device ID2 performed unauthorized behavior (there is uncertainty as to whether the communications terminal device ID2 tampered with the response information when relaying it).

On the other hand, if the verification is successful, the unauthorized terminal device inferring processing portion 140 knows that, within the information contained in the received and generated information, the response information received from the communications terminal device ID3 is erroneous (Step S25). Next, the unauthorized terminal inferring processing is performed with respect to the communications terminal device ID3, which is the next communications terminal device that relayed the response information (Step S14). The unauthorized terminal inferring processing described above is repeated.

In the present embodiment, as described above, the transmission source terminal is authenticated by the verification of Fi. Checking for tampering with the received and generated information is done by the verification of Gi. As shown in the flowcharts in FIGS. 4 and 5, the verifications of Fi and Gi are performed in order starting with the communications terminal device IDi that is closest to the unauthorized terminal inferring device 100.

Figure 6:
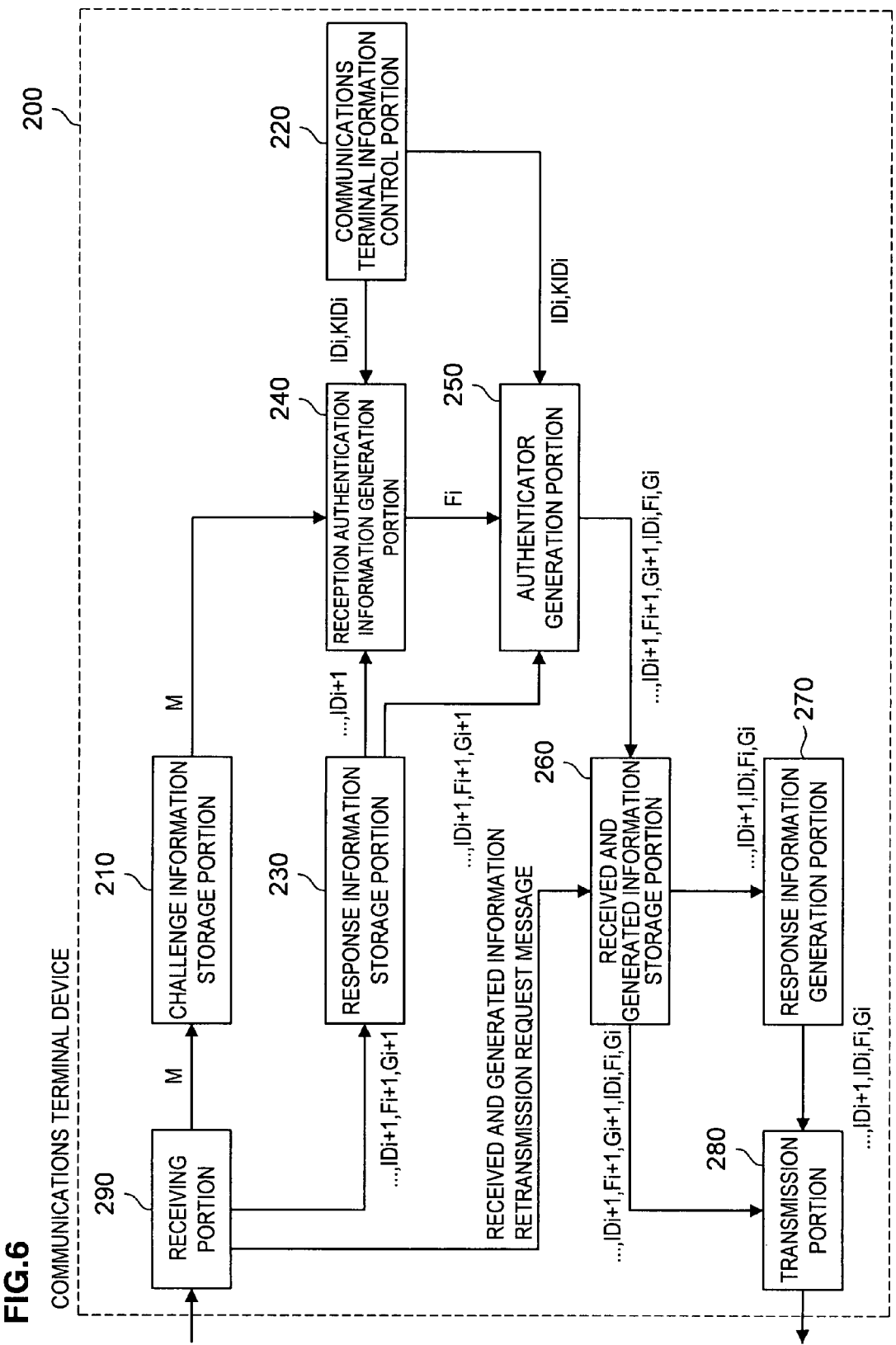
FIG. 6 is a block diagram that shows an internal configuration of a communications terminal device IDi according to the embodiment.

FIG. 6 is a block diagram that shows an internal configuration of the communications terminal device IDi according to the present embodiment. In FIG. 6, the communications terminal device IDi includes a challenge information storage portion 210, a communications terminal information generation portion 220, a response information storage portion 230, a reception authentication information generation portion 240, an authenticator generation portion 250, a received and generated information storage portion 260, a response information generation portion 270, a transmission portion 280, and a receiving portion 290.

The challenge information storage portion 210 stores the challenge information M that is given to it by the receiving portion 290. The challenge information storage portion 210 gives the challenge information M that it stores to the reception authentication information generation portion 240.

The communications terminal information generation portion 220 holds the terminal's own identifier (IDi) and key information (KIDi). The communications terminal information generation portion 220 gives the identifier and the key information to the reception authentication information generation portion 240 and the authenticator generation portion 250.

When the receiving portion 290 gives the response information from another communications terminal device IDi ( . . . , ID(i+1), F(i+1), G(i+1)) to the response information storage portion 230, the response information storage portion 230 gives the identifiers of all of the terminals involved in the relaying of the response information ( . . . , ID(i+1)), which are contained in the response information, to the reception authentication information generation portion 240. The response information storage portion 230 also gives the response information ( . . . , ID(i+1), F(i+1), G(i+1)) to the authenticator generation portion 250.

The reception authentication information generation portion 240 generates the authenticator (Fi) (refer to Equation 1) based on the challenge information M given to it by the challenge information storage portion 210, the terminal's own identifier (IDi) and key information (KIDi) given to it by the communications terminal information generation portion 220, and the identifiers ( . . . , ID(i+1)) given to it by the response information storage portion 230. However, in a case where the communications terminal device IDi starts the transmission of the response information using itself as a trigger, the giving of the identifiers ( . . . , ID(i+1)) by the response information storage portion 230 and the giving of the generated authenticator (Fi) to the authenticator generation portion 250 by the reception authentication information generation portion 240 may be omitted.

The authenticator generation portion 250 generates the authenticator (Gi) (refer to Equation 2) based on the response information ( . . . , ID(i+1), F(i+1), G(i+1)) given to it by the response information storage portion 230, the terminal's own identifier (IDi) and key information (KIDi) given to it by the communications terminal information generation portion 220, and the authenticator (Fi) given to it by the reception authentication information generation portion 240. The authenticator generation portion 250 gives the response information ( . . . , ID(i+1), F(i+1), G(i+1)), the terminal's own identifier (IDi), the authenticator (Fi), and the authenticator (Gi) to the received and generated information storage portion 260. However, in a case where the communications terminal device IDi starts the transmission of the response information using itself as a trigger, the giving of the response information ( . . . , ID(i+1), F(i+1), G(i+1)) by the response information storage portion 230 and the giving of the response information ( . . . , ID(i+1), F(i+1), G(i+1)) to the received and generated information storage portion 260 may be omitted.

The received and generated information storage portion 260 holds the response information ( . . . , ID(i+1), F(i+1), G(i+1)), the terminal's own identifier (IDi), the authenticator (Fi), and the authenticator (Gi) given to it by the authenticator generation portion 250. However, in a case where the communications terminal device IDi starts the transmission of the response information using itself as a trigger, the giving of the response information ( . . . , ID(i+1), F(i+1), G(i+1)) by the authenticator generation portion 250 may be omitted. From among the information it is given, the received and generated information storage portion 260 gives the response information identifiers ( . . . , ID(i+1)), the terminal's own identifier (IDi), the authenticator (Fi), and the authenticator (Gi) to the response information generation portion 270. In addition, when the receiving portion 290 gives it a message requesting the retransmission of the received and generated information, the received and generated information storage portion 260 provides the received and generated information that it holds.

When it is given the response information identifiers ( . . . , ID(i+1)), the terminal's own identifier (IDi), the authenticator (Fi), and the authenticator (Gi) from the received and generated information storage portion 260, the response information generation portion 270 generates the response information ( . . . , ID(i+1), IDi, Fi, Gi) and gives the generated response information to the transmission portion 280. However, in a case where the communications terminal device IDi starts the transmission of the response information using itself as a trigger, the giving of the response information ( . . . , ID(i+1), F(i+1), G(i+1)) by the received and generated information storage portion 260 may be omitted.

The transmission portion 280 transmits (or requests transmission of) the response information given to it by the response information generation portion 270 to the unauthorized terminal inferring device 100. The transmission portion 280 also transmits (or requests transmission of) the received and generated information given to it by the received and generated information storage portion 260 to the unauthorized terminal inferring device 100.

The receiving portion 290 gives the challenge information it receives to the challenge information storage portion 210. The receiving portion 290 also gives to the response information storage portion 230 the response information for which the receiving portion 290 has received a transmission request from the communications terminal device ID(i+1). The receiving portion 290 also gives to the received and generated information storage portion 260 the message it has received from the unauthorized terminal inferring device 100 requesting the retransmission of the received and generated information.

Next, the operation of an unauthorized terminal inferring system according to the present embodiment will be explained with reference to FIGS. 7 to 10. Here, the operation of the unauthorized terminal inferring system according to the present embodiment is made up of four levels of operation (S101, S102, S103, and S104).

First Level S101 (Transmission of Challenge Information M)

Figure 7:
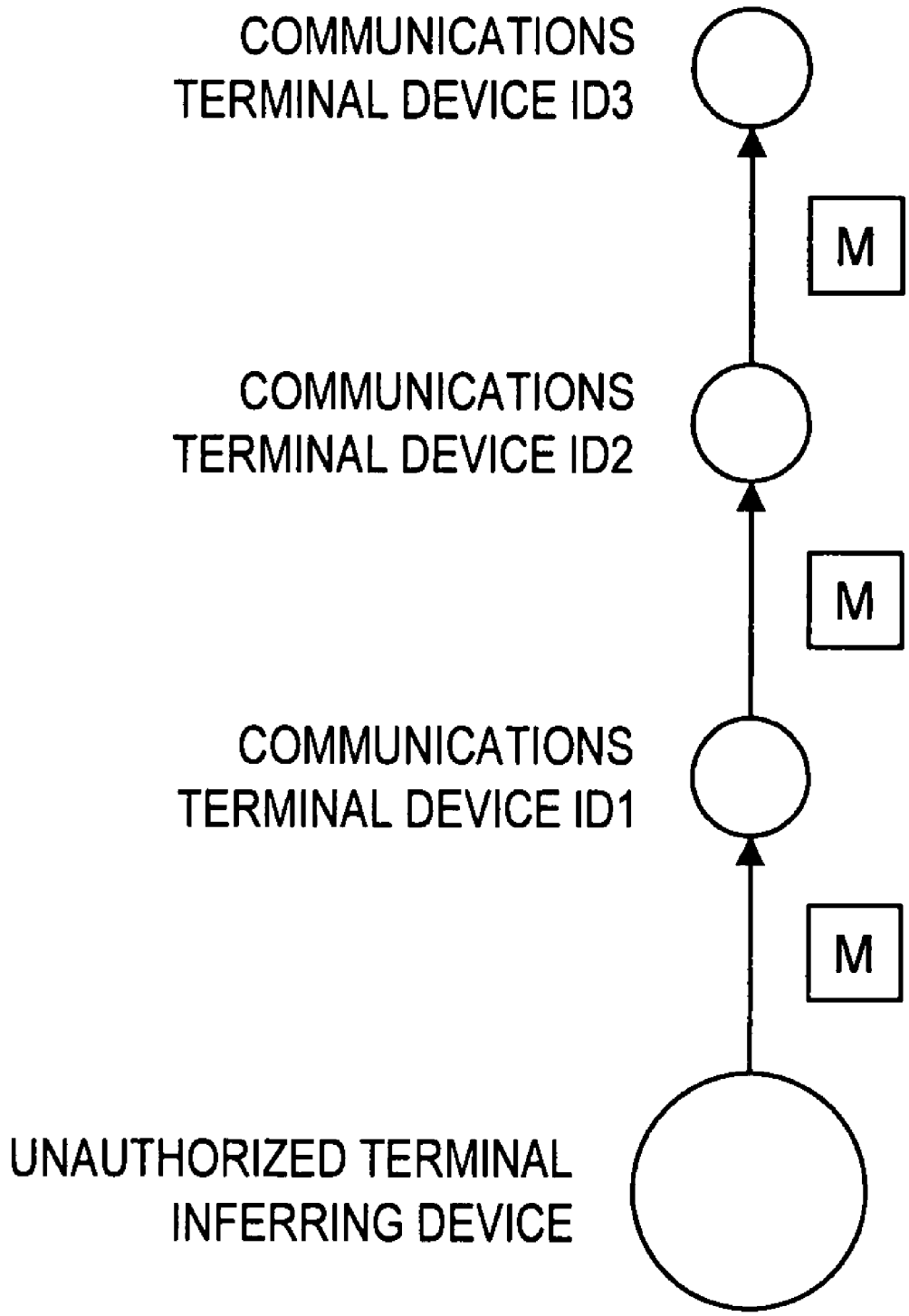
FIG. 7 is a schematic diagram that shows an operation of an unauthorized terminal inferring system according to the embodiment.

The first level S101, as shown in FIG. 7, is performed in the order described below.

The unauthorized terminal inferring device 100 generates the challenge information M in the challenge information generation portion 110 and transmits it to the communications terminal devices IDi through the transmission portion 160.

The communications terminal devices IDi receive the challenge information M through the receiving portions 290 and hold it in the challenge information storage portions 210.

Second Level S102 (Transmission of Response Information)

Figure 8:
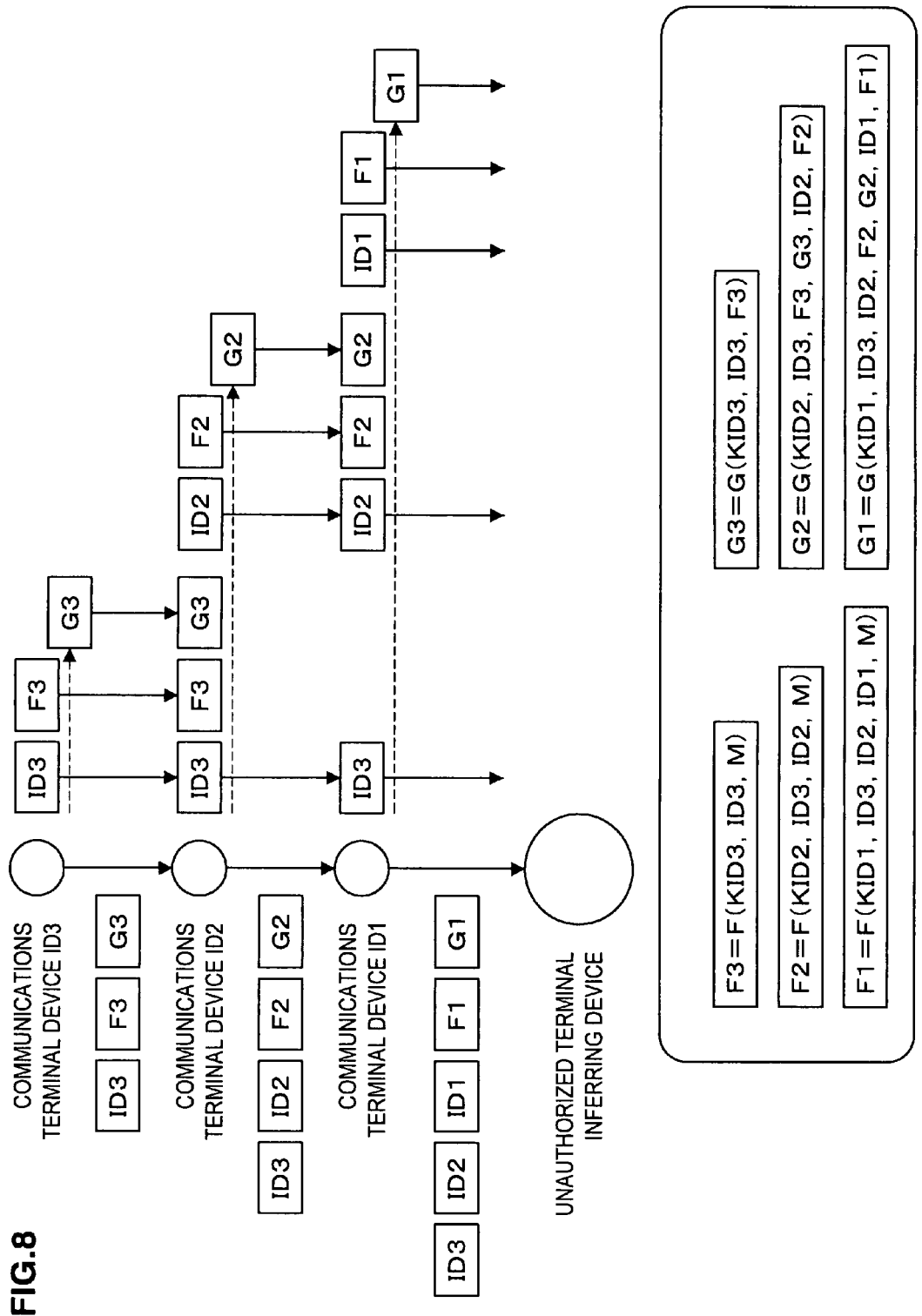
FIG. 8 is a schematic diagram that shows another operation of the unauthorized terminal inferring system according to the embodiment.

The second level S102, as shown in FIG. 8, is performed in the order described below.

The communications terminal device ID3 generates the authenticator F3 in the reception authentication information generation portion 240. The communications terminal device ID3 also generates the authenticator G3 in the authenticator generation portion 250. The communications terminal device ID3 holds the information it generates (ID3, F3, G3) in the received and generated information storage portion 260. Next, the communications terminal device ID3 generates the response information (ID3, F3, G3) in the response information generation portion 270 and transmits it to the unauthorized terminal inferring device 100 through the transmission portion 280.

The response information (ID3, F3, G3) transmitted by the communications terminal device ID3 is given to the response information storage portion 230 of the communications terminal device ID2. The communications terminal device ID2 generates the authenticator F2 in the reception authentication information generation portion 240. The communications terminal device ID2 also generates the authenticator G2 in the authenticator generation portion 250. The communications terminal device ID2 holds the response information transmitted by the communications terminal device ID3 and the information it generates (ID3, F3, G3, ID2, F2, G2) in the received and generated information storage portion 260. Next, the communications terminal device ID2 generates the response information (ID3, ID2, F2, G2) in the response information generation portion 270 and transmits it to the unauthorized terminal inferring device 100 through the transmission portion 280.

The response information (ID3, ID2, F2, G2) transmitted by the communications terminal device ID2 is given to the response information storage portion 230 of the communications terminal device ID1. The communications terminal device ID1 generates the authenticator F1 in the reception authentication information generation portion 240. The communications terminal device ID1 also generates the authenticator G1 in the authenticator generation portion 250. The communications terminal device ID1 holds the response information transmitted by the communications terminal device ID2 and the information it generates (ID3, ID2, F2, G2, ID1, F1, G1) in the received and generated information storage portion 260. Next, the communications terminal device ID1 generates the response information (ID3, ID2, ID1, F1, G1) in the response information generation portion 270 and transmits it to the unauthorized terminal inferring device 100 through the transmission portion 280.

Third Level S103 (Verification of Response Information)

Figure 9:
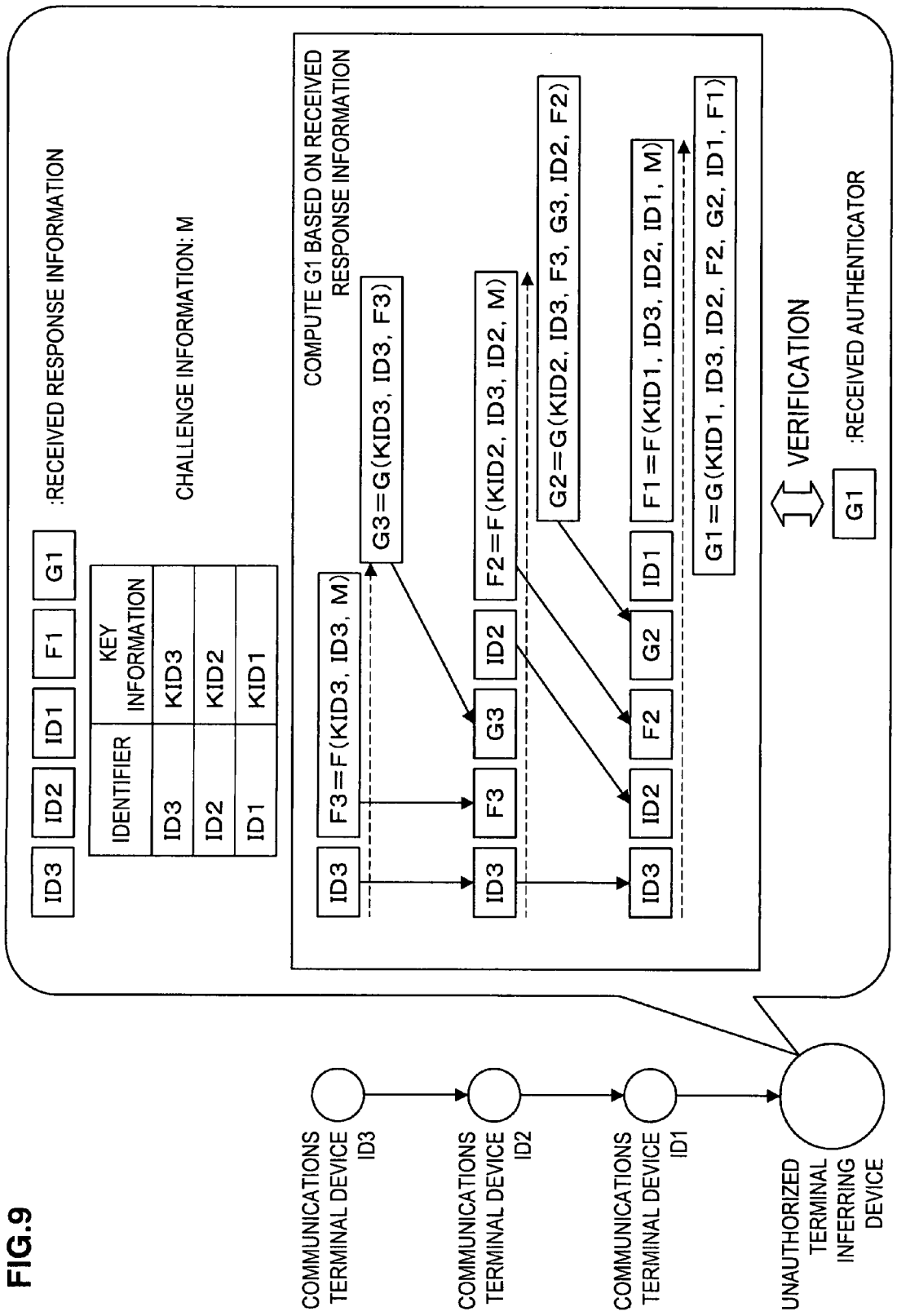
FIG. 9 is a schematic diagram that shows another operation of the unauthorized terminal inferring system according to the embodiment.

The third level S103, as shown in FIG. 9, is performed in the order described below.

The unauthorized terminal inferring device 100 receives the response information and, in the response information verification portion 130, verifies the authenticator G1 that is contained in the response information. If the verification is successful, the unauthorized terminal inferring device 100 knows that the challenge information M arrived correctly at the communications terminal device IDi that is indicated by the identifier that is contained in the response information. If the verification fails, the unauthorized terminal inferring device starts the unauthorized terminal inferring processing (to S104).

Fourth Level S104 (Verification of Response Information)

Figure 10:
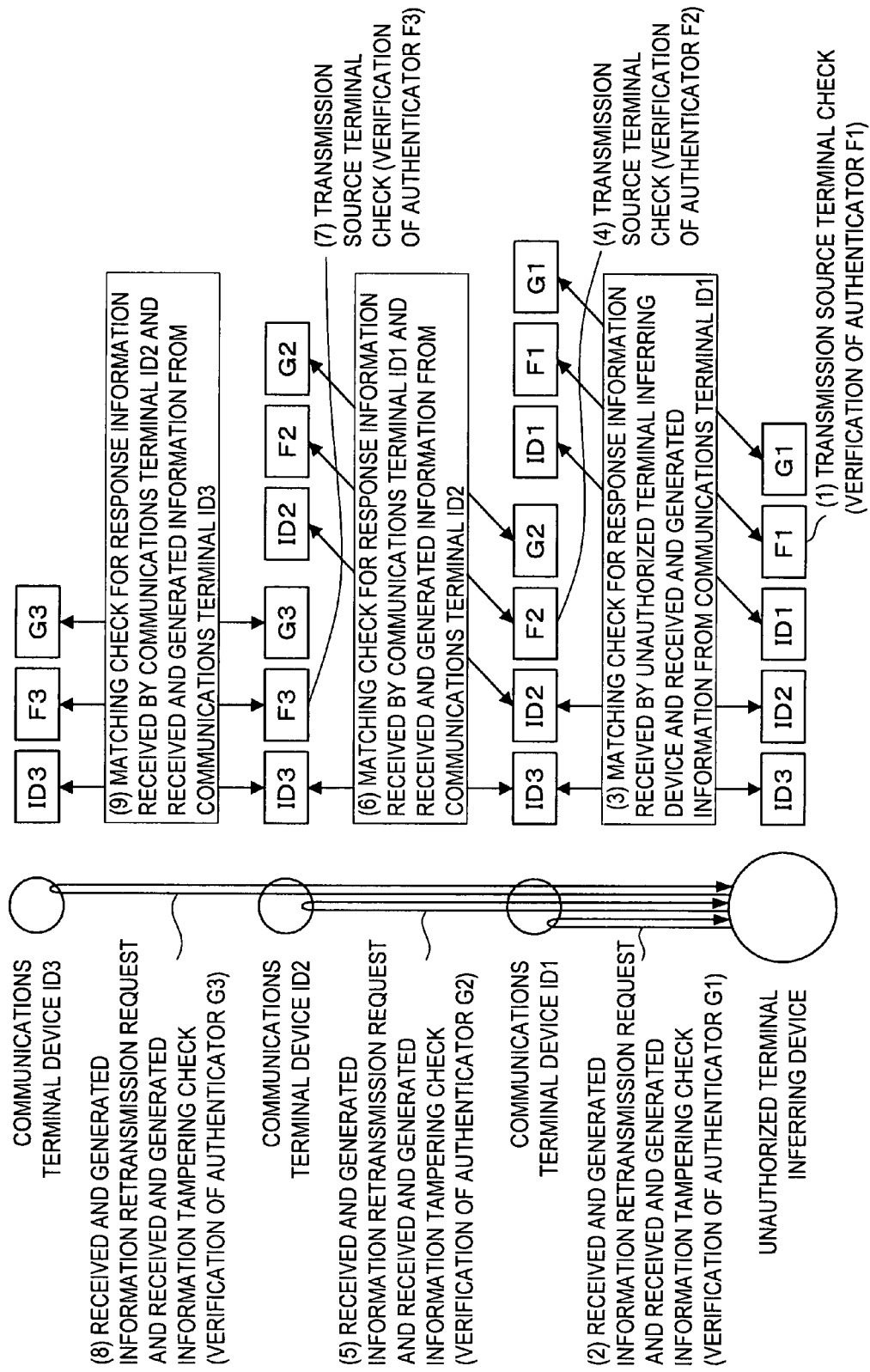
FIG. 10 is a schematic diagram that shows another operation of the unauthorized terminal inferring system according to the embodiment.

The fourth level S104, as shown in FIG. 10, is performed in the order described below.

The unauthorized terminal inferring device 100 starts the unauthorized terminal inferring processing in the unauthorized terminal device inferring processing portion 140. Here, the unauthorized terminal is inferred according to the flowcharts shown in FIGS. 4 and 5.

The verification of the transmission source terminal for the response information (the verification of the authenticator Fi) is performed in the response information verification portion 130.

A check to see whether a communications terminal has tampered with the received and generated information that was received (the verification of the authenticator Gi) is performed in the generated information verification portion 150.

As explained above, the verifications of Fi and Gi are performed in order starting with the communications terminal device IDi that is closest to the unauthorized terminal inferring device 100.

According to the present embodiment, the communications terminal devices IDi that make up the multi-hop network generate the response information in response to the received challenge information and transmit the generated response information to the unauthorized terminal inferring device 100. The unauthorized terminal inferring device 100 verifies whether or not the response information is legitimate. If the verification fails, the unauthorized terminal inferring device 100 determines that a communications terminal device IDi that behaved in an unauthorized manner is present among the communications terminal devices IDi involved in the transmission of the response information. The unauthorized terminal inferring device 100 can infer which communications terminal device IDi behaved in an unauthorized manner by requesting that each of the communications terminal devices IDi retransmit the received information and the generated information.

In the diagrams shown in FIGS. 7 to 10 that explain the system's operation, the communications terminal device ID2 is defined as the unauthorized terminal device. The results of the unauthorized terminal inferring processing in the unauthorized terminal inferring device 100 will be illustrated below by examples using eight patterns A to H. The patterns A to H will be explained below with each step corresponding to a step in the flowcharts in FIGS. 4 and 5.

Pattern A

Case where the communications terminal device ID2 alters the challenge information M to M' and relays it to the communications terminal device ID3.

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1, so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3, ID2, ID1, F1, G1' that was received from the communications terminal device ID1 matches the information contained in the received and generated information that was also received from the communications terminal device ID1 (Steps S10, S11, S12, and S14).

(f) The unauthorized terminal inferring device 100 successfully verifies F2, so it knows that the response information came by way of the communications terminal device ID2. The unauthorized terminal inferring device 100 also knows that the correct challenge information M arrived at ID1 (Steps S15 and S16).

(g) The unauthorized terminal inferring device 100 obtains the received and generated information from the communications terminal device ID2 (Steps S18 and S19).

(h) By verifying G2' in the received and generated information, the unauthorized terminal inferring device 100 confirms that the received and generated information was not altered while being relayed and that it was transmitted by the communications terminal device ID2 (Step S20).

(i) The unauthorized terminal inferring device 100 checks whether or not the response information ID3, ID2, F2, G2' that was received from the communications terminal device ID2, and that was contained in the received and generated information that was received from the communications terminal device ID1, matches the information contained in the received and generated information that was also received from the communications terminal device ID2 (Steps S23, S24, S25, and S14).

(j) The verification of F3 by the unauthorized terminal inferring device 100 fails, so the unauthorized terminal inferring device 100 infers the three possibilities described below (Steps S15 and S17).

The communications terminal device ID3 behaved in an unauthorized manner.
  The communications terminal device ID2 behaved in an unauthorized manner.
  Another device pretended to be the communications terminal device ID3 and transmitted the response information.

Pattern B

Case where the communications terminal device ID2 alters the identifier of the communications terminal device ID3 that was contained in the response information received from the communications terminal device ID3 (changing ID3 to ID3').

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1', so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3', ID2, ID1, F1', G1' that was received from the communications terminal device ID1 matches the information contained in the received and generated information that was also received from the communications terminal device ID1 (Steps S10, S11, S12, and S14).

(f) The unauthorized terminal inferring device 100 successfully verifies F2', so it knows that the response information came by way of the communications terminal device ID2. The unauthorized terminal inferring device 100 also knows that the correct challenge information M arrived at ID1 (Steps S15 and S16).

(g) The unauthorized terminal inferring device 100 obtains the received and generated information from the communications terminal device ID2 (Steps S18 and S19).

Case where the identifier ID3 was transmitted in the received and generated information before it was altered:

(h) By verifying G2' in the received and generated information, the unauthorized terminal inferring device 100 confirms that the received and generated information was not altered while being relayed and that it was transmitted by the communications terminal device ID2 (Step S20).

(i) The unauthorized terminal inferring device 100 detects that the identifier ID3 contained in the response information that is deemed to have been received from the communications terminal device ID2, and that was contained in the received and generated information that was received from the communications terminal device ID1, does not match the identifier ID3' contained in the received and generated information that was also received from the communications terminal device ID2. The unauthorized terminal inferring device 100 therefore infers the possibilities described below (Steps S23, S24, and S26).

The communications terminal device ID2 behaved in an unauthorized manner.
  The communications terminal device ID1 behaved in an unauthorized manner.

Case where the altered identifier ID3' was transmitted in the received and generated information:

(j) By verifying G2' in the received and generated information, the unauthorized terminal inferring device 100 confirms that the received and generated information was not altered while being relayed and that it was transmitted by the communications terminal device ID2 (Step S20).

(k) The unauthorized terminal inferring device 100 checks whether or not the response information ID3', ID2, F2', G2' that was received from the communications terminal device ID2, and that was contained in the received and generated information that was received from the communications terminal device ID1, matches the information contained in the received and generated information that was also received from the communications terminal device ID2 (Steps S23, S24, S25, and S14).

(l) The verification of F3' by the unauthorized terminal inferring device 100 fails, so the unauthorized terminal inferring device 100 infers the three possibilities described below (Steps S15 and S17).

The communications terminal device ID3 behaved in an unauthorized manner.
  The communications terminal device ID2 behaved in an unauthorized manner.
  Another device pretended to be the communications terminal device ID3 and transmitted the response information.

Pattern C

Case where the communications terminal device ID2 alters the authenticator F3 that was contained in the response information received from the communications terminal device ID3 (changing F3 to F3').

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1, so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3, ID2, ID1, F1, G1' that was received from the communications terminal device ID1 matches the information contained in the received and generated information that was also received from the communications terminal device ID1 (Steps S10, S11, S12, and S14).

(f) The unauthorized terminal inferring device 100 successfully verifies F2, so it knows that the response information came by way of the communications terminal device ID2. The unauthorized terminal inferring device 100 also knows that the correct challenge information M arrived at ID2 (Steps S15 and S16).

(g) The unauthorized terminal inferring device 100 obtains the received and generated information from the communications terminal device ID2 (Steps S18 and S19).

Cases where the authenticator F3 was transmitted in the received and generated information before it was altered:

Case where the authenticator G2' in the received and generated information was regenerated as G2 and transmitted:

(h) By successfully verifying G2 in the received and generated information, the unauthorized terminal inferring device 100 confirms that the received and generated information was not altered while being relayed and that it was transmitted by the communications terminal device ID2 (Step S20).

(i) The unauthorized terminal inferring device 100 detects that the authenticator G2' contained in the response information that is deemed to have been received from the communications terminal device ID2, and that was contained in the received and generated information that was received from the communications terminal device ID1, does not match the authenticator G2 contained in the received and generated information that was also received from the communications terminal device ID2. The unauthorized terminal inferring device 100 therefore infers the possibilities described below (Steps S23, S24, and S26).

The communications terminal device ID2 behaved in an unauthorized manner.

The communications terminal device ID1 behaved in an unauthorized manner.

Case where the authenticator G2' was transmitted:

(j) The verification of G2' in the received and generated information by the unauthorized terminal inferring device 100 fails, so the unauthorized terminal inferring device 100 infers the possibilities described below (Steps S20 and S22).

The communications terminal device ID2 behaved in an unauthorized manner.

The communications terminal device ID1 behaved in an unauthorized manner.

Another device pretended to be the communications terminal device ID2 and transmitted the received and generated information.

Case where the altered received and generated information F3' was transmitted as the received and generated information:

(h) By verifying G2' in the received and generated information, the unauthorized terminal inferring device 100 confirms that the received and generated information was not altered while being relayed and that it was transmitted by the communications terminal device ID2 (Step S20).

(i) The unauthorized terminal inferring device 100 checks whether or not the response information ID3, ID2, F2, G2' that was received from the communications terminal device ID2, and that was contained in the received and generated information that was received from the communications terminal device ID1, matches the information contained in the received and generated information that was also received from the communications terminal device ID2 (Steps S23, S24, S25, and S14).

(j) The verification of F3' by the unauthorized terminal inferring device 100 fails, so the unauthorized terminal inferring device 100 infers the possibilities described below (Steps S15 and S17).

The communications terminal device ID3 behaved in an unauthorized manner.

The communications terminal device ID2 behaved in an unauthorized manner.

Another device pretended to be the communications terminal device ID3 and transmitted the response information.

Pattern D

Case where the communications terminal device ID2 alters the authenticator G3 that was contained in the response information received from the communications terminal device ID3 (changing G3 to G3').

Steps (a) to (f) are the same as for pattern A.

(g) The unauthorized terminal inferring device 100 obtains the received and generated information from the communications terminal device ID2 (Steps S18 and S19).

Case where, at (g), the communications terminal device ID 2 transmitted the altered authenticator G3' in the received and generated information:

(h) By verifying G2' in the received and generated information, the unauthorized terminal inferring device 100 confirms that the received and generated information was not altered while being relayed and that it was transmitted by the communications terminal device ID2 (Step S20).

(i) The unauthorized terminal inferring device 100 checks whether or not the response information ID3, ID2, F2, G2' that was contained in the received and generated information that was received from the communications terminal device ID1 matches the information contained in the received and generated information that was received from the communications terminal device ID2 (Steps S23, S24, S25, and S14).

(j) The unauthorized terminal inferring device 100 successfully verifies F3, so it knows that the response information came by way of the communications terminal device ID3. The unauthorized terminal inferring device 100 also knows that the correct challenge information M arrived at ID3 (Steps S15 and S16).

(k) The unauthorized terminal inferring device 100 obtains the received and generated information from the communications terminal device ID3 (Steps S18 and S19).

(l) By verifying G3 in the received and generated information, the unauthorized terminal inferring device 100 confirms that the received and generated information was not altered while being relayed and that it was transmitted by the communications terminal device ID2 (Step S20).

(m) The unauthorized terminal inferring device 100 detects that the authenticator G3' contained in the response information that was received from the communications terminal device ID2 does not match the authenticator G3 contained in the received and generated information that was also received from the communications terminal device ID2. The unauthorized terminal inferring device 100 therefore infers the possibilities described below (Steps S23, S24, and S26).

The communications terminal device ID3 behaved in an unauthorized manner.

The communications terminal device ID2 behaved in an unauthorized manner.

Case where, at (g), the communications terminal device ID 2 transmitted the authenticator G3 in the received and generated information before G3 was altered:

(h) The verification of G2' in the received and generated information by the unauthorized terminal inferring device 100 fails, so the unauthorized terminal inferring device 100 infers the possibilities described below (Steps S20 and S22).

The communications terminal device ID2 behaved in an unauthorized manner.

The communications terminal device ID1 behaved in an unauthorized manner.

Another device pretended to be the communications terminal device ID2 and transmitted the received and generated information.

Pattern E

Case where the communications terminal device ID2's own identifier is counterfeit (ID2 is changed to ID2'):

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1', so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3, ID2', ID1, F1', G1' that was received from the communications terminal device ID1 matches the information contained in the received and generated information that was also received from the communications terminal device ID1 (Steps S10, S11, S12, and S14).

(f) The verification of F2' by the unauthorized terminal inferring device 100 fails, so the unauthorized terminal inferring device 100 infers the possibilities described below (Steps S15 and S17).

The communications terminal device ID2 behaved in an unauthorized manner.

The communications terminal device ID1 behaved in an unauthorized manner.

Another device pretended to be the communications terminal device ID2 and transmitted the response information.

Pattern F

Case where the communications terminal device ID2 did not append the legitimate authenticator F2 (F2 is changed to F2'):

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1, so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3, ID2, ID1, F1, G1' that was received from the communications terminal device ID1 matches the information contained in the received and generated information that was also received from the communications terminal device ID1 (Steps S10, S11, S12, and S14).

(f) The verification of F2' by the unauthorized terminal inferring device 100 fails, so the unauthorized terminal inferring device 100 infers the possibilities described below (Steps S15 and S17).

The communications terminal device ID2 behaved in an unauthorized manner.

The communications terminal device ID1 behaved in an unauthorized manner.

Another device pretended to be the communications terminal device ID2 and transmitted the response information.

Pattern G

Case where the communications terminal device ID2 did not append the legitimate authenticator G2 (G2 is changed to G2':

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1, so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID3, ID2, ID1, F1, G1' that was received from the communications terminal device ID1 matches the information contained in the received and generated information that was also received from the communications terminal device ID1 (Steps S10, S11, S12, and S14).

(f) The unauthorized terminal inferring device 100 successfully verifies F2, so it knows that the response information came by way of the communications terminal device ID2. The unauthorized terminal inferring device 100 also knows that the correct challenge information M arrived at ID2 (Steps S15 and S16).

(g) The unauthorized terminal inferring device 100 obtains the received and generated information from the communications terminal device ID2 (Steps S18 and S19).

Case where the authenticator G2 was transmitted in the received and generated information before it was altered:

(h) By successfully verifying G2 in the received and generated information, the unauthorized terminal inferring device 100 confirms that the received and generated information was not altered while being relayed and that it was transmitted by the communications terminal device ID2 (Step S20).

(i) The unauthorized terminal inferring device 100 detects that the authenticator G2' contained in the response information that is deemed to have been received from the communications terminal device ID2, and that was contained in the received and generated information that was received from the communications terminal device ID1, does not match the authenticator G2 contained in the received and generated information that was also received from the communications terminal device ID2. The unauthorized terminal inferring device 100 therefore infers the possibilities described below (Steps S23, S24, and S26).

The communications terminal device ID2 behaved in an unauthorized manner.

The communications terminal device ID1 behaved in an unauthorized manner.

Case where the altered authenticator G2' was transmitted:

(h) The verification of G2' in the received and generated information by the unauthorized terminal inferring device 100 fails, so the unauthorized terminal inferring device 100 infers the possibilities described below (Steps S20 and S22).

The communications terminal device ID2 behaved in an unauthorized manner.

The communications terminal device ID1 behaved in an unauthorized manner.

Another device pretended to be the communications terminal device ID2 and transmitted the received and generated information.

Pattern H

Case where the communications terminal device ID2 deleted the identifier of the communications terminal device that relayed the response information (ID3 is deleted from the response information):

(a) The verification of G1' by the unauthorized terminal inferring device 100 fails, so the unauthorized terminal inferring device 100 starts the unauthorized terminal inferring processing.

(b) The unauthorized terminal inferring device 100 successfully verifies F1', so it knows that the response information came by way of the communications terminal device ID1. The unauthorized terminal inferring device 100 also knows that the correct challenge information M arrived at ID1 (Steps S1, S2, and S3).

(c) The unauthorized terminal inferring device 100 obtains the received and generated information from the communications terminal device ID1 (Steps S5 and S6).

(d) By verifying G1' in the received and generated information, the unauthorized terminal inferring device 100 confirms that the received and generated information was not altered while being relayed and that it was transmitted by the communications terminal device ID1 (Step S7).

(e) The unauthorized terminal inferring device 100 checks whether or not the response information ID2, ID1, F1', G1' that was received from the communications terminal device ID1 matches the information contained in the received and generated information that was also received from the communications terminal device ID1 (Steps S10, S11, S12, and S14).

(f) The verification of F2 by the unauthorized terminal inferring device 100 fails, so the unauthorized terminal inferring device 100 infers the possibilities described below (Steps S15 and S17).

The communications terminal device ID2 behaved in an unauthorized manner.

The communications terminal device ID1 behaved in an unauthorized manner.

Another device pretended to be the communications terminal device ID2 and transmitted the response information.

According to the present embodiment as explained above, when a communications terminal device that is recognized as legitimate behaves in an unauthorized manner, it is possible to infer which device is the communications terminal device that behaved in an unauthorized manner. Therefore, in a case where a threat exists that legitimate communications terminal devices that have been authenticated by the network will behave in an unauthorized manner because an attacker has improperly obtained the key information, it is possible to infer which of the communications terminal devices behaved in an unauthorized manner. It thus becomes possible to perform processing to cut off from the network any communications terminal devices that are inferred to be unauthorized communications terminal devices.

On the other hand, a separate effect of the present invention is that by successfully verifying the response information, the unauthorized terminal inferring device 100 knows that the challenge information M has arrived correctly at all of the communications terminal devices involved in the relaying of the response information (the communications terminal devices indicated by the identifiers that are contained in the response information). For example, if the user wants to deliver an important message to the communications terminal devices in the network, the important message can be set as the challenge information, and the system can confirm that the important message reliably arrived at the communications terminal devices.

The preferred embodiment of the present invention has been described with reference to the appended drawings, but it is clearly apparent that the present invention is not limited by this example. It should be understood by those skilled in the art that various modifications, combinations, sub-combinations and alterations may occur depending on design requirements and other factors insofar as they are within the scope of the appended claims or the equivalents thereof.

Various modifications are described even in the explanation of the embodiment above, but additional modifications such as the examples given below may also be used.

For example, if the verification of the response information fails for a plurality of routes, the unauthorized terminal inferring processing may be performed for each route, and the unauthorized terminal device(s) may be inferred from statistical information on inference results.

In addition, when the unauthorized terminal inferring device 100 knows the entire route by which the response information was relayed, the identifiers of every communications terminal device involved in the transmission of the response information do not necessarily have to be included in the response information.

A device other than the unauthorized terminal inferring device 100 may transmit the challenge information without the challenge information being transmitted by the unauthorized terminal inferring device 100. The unauthorized terminal inferring device 100 may safely obtain the transmitted challenge information by other measures.

The configuration of the multi-hop network is not specifically limited. It may be a tree-type network, and it may be a mesh-type network.

The route by which the response information is relayed is not specifically limited. It may be determined according to a routing table that is held by the communications terminal devices IDi, and it may be randomly determined. The route may also be designated by the unauthorized terminal inferring device 100 by any sort of method. The route may be ring-shaped, and it may be made up of any number of redundant nodes. Furthermore, the response information may be transmitted by a plurality of routes from any number of communications terminal devices IDi.

What is claimed is:

1. An unauthorized terminal inferring system comprising:
a plurality of communications terminal devices; and
an unauthorized terminal inferring device, wherein
the communication terminal devices and the unauthorized terminal inferring devices are connected by a multi-hop network and the unauthorized terminal inferring system uses the unauthorized terminal inferring device to infer which communications terminal device performed an unauthorized operation,
wherein the unauthorized terminal inferring device includes
a communications terminal information control portion that controls identification information and key information for the communications terminal devices that make up the network,
a generation portion that generates challenge information to infer that the unauthorized operation occurred,
a transmission portion that transmits the challenge information to the communications terminal devices,
a receiving portion that receives from the communications terminal devices response information that corresponds to the challenge information,
a response information verification portion that verifies whether or not an authenticator that is contained in the response information that was transmitted by the communications terminal devices is correct,
an unauthorized terminal device inferring processing portion that, in a case where the verification result indicates that the response information is not legitimate, requests that each of the communications terminal devices sequentially retransmit received and generated information, then, based on the retransmitted received and generated information, infers which communications terminal device performed the unauthorized operation by matching the retransmitted received and generated information for each of the communications terminal devices with the challenge information; and
each of the communications terminal devices includes
a receiving portion that receives the challenge information from another communications terminal device or the unauthorized terminal inferring device by one of a relayed transmission and a direct transmission,
an authenticator generation portion that generates an authenticator based on the identification information and the key information,
a received and generated information storage portion that holds the received and generated information, which is obtained by appending the authenticator that the communications terminal device generates to the response information that was received from another communications terminal device,
a response information generation portion that generates the response information by appending the authenticator that the communications terminal device generates to the response information that was received from another communications terminal device, and
a transmission portion that transmits the response information generated by appending the authenticator to the response information that was received from another communications terminal device or the received and generated information to another communications terminal device or the unauthorized terminal inferring device by one of a relayed transmission and a direct transmission.

2. The unauthorized terminal inferring system according to claim 1, wherein the communications terminal device that performed the unauthorized operation is one of a communications terminal device that pretended to be an authentic communications terminal device and a communications terminal device that altered authentic data.

3. The unauthorized terminal inferring system according to claim 1, wherein the unauthorized terminal device inferring processing portion requests that each of the communications terminal devices respond in a specified order.

4. The unauthorized terminal inferring system according to claim 3, wherein the specified order comprises starting with the communications terminal device having a least number of hops from the unauthorized terminal inferring device.

5. An unauthorized terminal inferring device that is connected by a multi-hop network to a plurality of communications terminal devices and that infers which communications terminal device performed an unauthorized operation, the unauthorized terminal inferring device comprising:
a communications terminal information control portion that controls identification information and key information for the communications terminal devices that make up the network;
a generation portion that generates challenge information to infer that the unauthorized operation occurred;
a transmission portion that transmits the challenge information to the communications terminal devices;
a receiving portion that receives from the communications terminal devices response information that corresponds to the challenge information;
a response information verification portion that verifies whether or not an authenticator that is contained in the response information that was transmitted by the communications terminal devices is correct; and
an unauthorized terminal device inferring processing portion that, in a case where the verification result indicates that the response information is not legitimate, requests that each of the communications terminal devices sequentially retransmit received and generated information, then, based on the retransmitted received and generated information, infers which communications terminal device performed the unauthorized operation by matching the retransmitted received and generated information for each of the communications terminal devices with the challenge information.

6. The unauthorized terminal inferring device according to claim 5, further comprising a challenge information generation portion that generates the challenge information.

7. The unauthorized terminal inferring device according to claim 5, wherein the communications terminal device that performed the unauthorized operation is one of a communications terminal device that pretended to be an authentic communications terminal device and a communications terminal device that altered authentic data.

8. The unauthorized terminal inferring system according to claim 5, wherein the unauthorized terminal device inferring processing portion requests that each of the communications terminal devices respond in a specified order.

9. The unauthorized terminal inferring system according to claim 8, wherein the specified order comprises starting with the communications terminal device having a least number of hops from the unauthorized terminal inferring device.

10. A communications terminal device that is connected by a multi-hop network to a plurality of other communications terminal devices and to an unauthorized terminal inferring device, the communications terminal device comprising:
   a receiving portion that receives challenge information from one of another communications terminal device and the unauthorized terminal inferring device by one of a relayed transmission and a direct transmission;
   a reception authentication information generation portion that generates a first authenticator based on at least the challenge information;
   an authenticator generation portion that generates a second authenticator based on identification information and key information, wherein the second authenticator differs from the first authenticator;
   a received and generated information storage portion that holds received and generated information, which is obtained by appending the two different authenticators that the communications terminal device generates to response information that was received from another communications terminal device, wherein the two different authenticators are not related to the response information;
   a response information generation portion that generates response information from the communications terminal device by appending the two different authenticators that the communications terminal device generates to the response information that was received from another communications terminal device; and
   a transmission portion that transmits one of the response information generated by appending the authenticator to the response information that was received from another communications terminal device and the received and generated information to one of another communications terminal device and the unauthorized terminal inferring device by one of a relayed transmission and a direct transmission.

11. The communications terminal device according to claim 10, further comprising a challenge information storage portion that receives and stores the challenge information from the receiving portion.

12. The communications terminal device according to claim 10, further comprising a response information storage portion to provide identifiers of at least one terminal involved in relaying the response information.

\* \* \* \* \*